US008300985B2

(12) United States Patent
Lee et al.

(10) Patent No.: US 8,300,985 B2
(45) Date of Patent: Oct. 30, 2012

(54) IMAGE-REGISTRATION METHOD, MEDIUM, AND APPARATUS

(75) Inventors: Seok Lee, Seoul (KR); Seong-deok Lee, Suwon-si (KR); Hyun-chul Song, Seoul (KR); Won-hee Choe, Gyeongju-si (KR); Jae-hyun Kwon, Yongin-si (KR); Kang-eui Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1102 days.

(21) Appl. No.: 12/222,963

(22) Filed: Aug. 20, 2008

(65) Prior Publication Data
US 2009/0067752 A1 Mar. 12, 2009

(30) Foreign Application Priority Data
Sep. 11, 2007 (KR) .................. 10-2007-0092231

(51) Int. Cl.
G06K 9/00 (2006.01)
G06K 9/32 (2006.01)

(52) U.S. Cl. .................. 382/294; 382/107; 382/295
(58) Field of Classification Search .................. 382/103, 382/107, 294, 295
See application file for complete search history.

(56) References Cited

U.S. PATENT DOCUMENTS

| 5,548,346 A * | 8/1996 | Mimura et al. ............... 348/738 |
| 2002/0154833 A1 * | 10/2002 | Koch et al. .................. 382/325 |
| 2005/0265611 A1 * | 12/2005 | Valadez ...................... 382/236 |
| 2006/0018382 A1 * | 1/2006 | Shi et al. .................. 375/240.16 |

OTHER PUBLICATIONS

Song et al., "Multiresolution block matching algorithm and its LSI architecture for fast motion estimation in MPEG-2 video encoder," SPIE vol. 5022 (2003).*
Dipanda et al., "Multiresolution motion estimation with discontinuity preservation using MRF and determination of the regularization hyperparameter," SPIE o. 3642 (1999).*
Zhang et al. "Successive elimination motion estimation algorithm based on multi-resolution," SPIE vol. 6595 (2007).*

* cited by examiner

*Primary Examiner* — Yubin Hung
(74) *Attorney, Agent, or Firm* — Staas & Halsey LLP

(57) ABSTRACT

An image-registration method, medium, and apparatus obtaining first and second images, generating first and second image pyramids based on the first and second images, respectively, by performing sub-sampling which reduces the length and width of each of the first and second images by half, and determining one of five directions as an optimal movement direction for a current level of the first and second image pyramids based on two images belonging to a corresponding level, updating a motion vector for the current level based on the optimal movement direction for the current level and updating a first image belonging to a level directly below the current level based on the updated motion vector for the current level, wherein the updating comprises updating a motion vector for each of a plurality of levels of the first and second image pyramids in an order from an uppermost level to a lowermost level.

14 Claims, 6 Drawing Sheets

IMAGE PYRAMID

IMAGE-REGISTRATION METHOD, MEDIUM, AND APPARATUS

CROSS-REFERENCE TO RELATED APPLICATIONS

This application claims priority from Korean Patent Application No. 10-2007-0092231 filed on Sep. 11, 2007 in the Korean Intellectual Property Office, the disclosure of which is incorporated herein by reference in its entirety.

BACKGROUND

1. Field

One or more embodiments relate to an image-registration method, medium, and apparatus, and, more particularly, to an image-registration method, medium, and apparatus in which image registration can be stably performed at high speed even on images having very different properties by using image pyramids and reducing the amount of computation required to calculate objective functions for each level of the image pyramids.

2. Description of the Related Art

Image registration is a process of geometrically matching two or more images that are physically similar to one another on a region-by-region basis.

In recent years, various image registration techniques have been suggested that are capable of generating high dynamic range (HDR) images, performing image registration for the purpose of motion deblurring or performing image registration on various types of images (e.g., an image captured by a typical camera and an image captured by an infrared camera, or a computed tomography (CT) image and a magnetic resonance imaging (MRI) image) captured by different image-capturing apparatuses with different modalities.

Conventional image-registration methods using a luminance-based method can be applied only to images obtained under similar photographing conditions (such as luminance or motion blur). Images obtained under different photographing conditions are highly likely to have very different properties from each other. If two images for which image registration is to be performed have very different properties from each other, motion estimation for the two images may not be able to be properly performed. For example, in the case of generating an HDR image by performing image registration on two images obtained from different exposure times, edge information of very bright or very dark regions in the two images is highly likely to be lost especially when there is a huge difference between the luminance levels of the two images. In addition, in the case of performing multiple exposure-based motion deblurring on two images obtained from different exposure times, image registration may not be able to be properly performed because the amount of motion blur varies from one image to another due to the different exposure times.

Conventional image-registration methods using a probability-based method such as mutual information or normalized mutual information can enhance the stability of image registration even when images have very different properties from each other, but are not suitable for use in camera systems that operate online because of their considerable amounts of computation.

SUMMARY

One or more embodiments provide an image-registration method, medium, and apparatus in which the speed of image registration can be improved by using image pyramids and calculating only five objective functions for each level of the image pyramids, and in which image registration can be stably performed even on images having very different properties from each other by calculating objective functions using a conventional probability-based method.

Additional aspects and/or advantages will be set forth in part in the description which follows and, in part, will be apparent from the description, or may be learned by practice of the invention.

According to an aspect of the present invention, there is provided an image-registration method including obtaining a first image and a second image, generating first and second image pyramids based on the first and second images, respectively, by performing sub-sampling which reduces the length and width of each of the first and second images by half, and determining one of five directions respectively corresponding to (−1, 0), (1, 0), (0, 0), (0, −1), and (0, 1) as an optimal movement direction for a current level of the first and second image pyramids based on two images belonging to a corresponding level, updating a motion vector for the current level based on the optimal movement direction for the current level and updating a first image belonging to a level directly below the current level based on the updated motion vector for the current level, wherein the updating comprises updating a motion vector for each of a plurality of levels of the first and second image pyramids in an order from an uppermost level to a lowermost level.

According to another aspect of the present invention, there is provided an image-registration apparatus including an image-capturing module which obtains a first image and a second image using an image sensor, a pyramid-generation module which generates first and second image pyramids based on the first and second images, respectively, by performing sub-sampling which reduces the length and width of each of the first and second images by half, a direction-calculation module which determines one of five directions respectively corresponding to (−1, 0), (1, 0), (0, 0), (0, −1), and (0, 1) as an optimal movement direction for a current level of the first and second image pyramids based on two images belonging to the current level, a motion-vector-calculation module which updates a motion vector for the current level based on the optimal movement direction for the current level, and an image-update module which updates a first image belonging to a level directly below the current level based on the updated motion vector for the current level, wherein the motion-vector-calculation module calculates a motion vector for each of a plurality of levels of the first and second image pyramids in an order from an uppermost level to a lowermost level.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
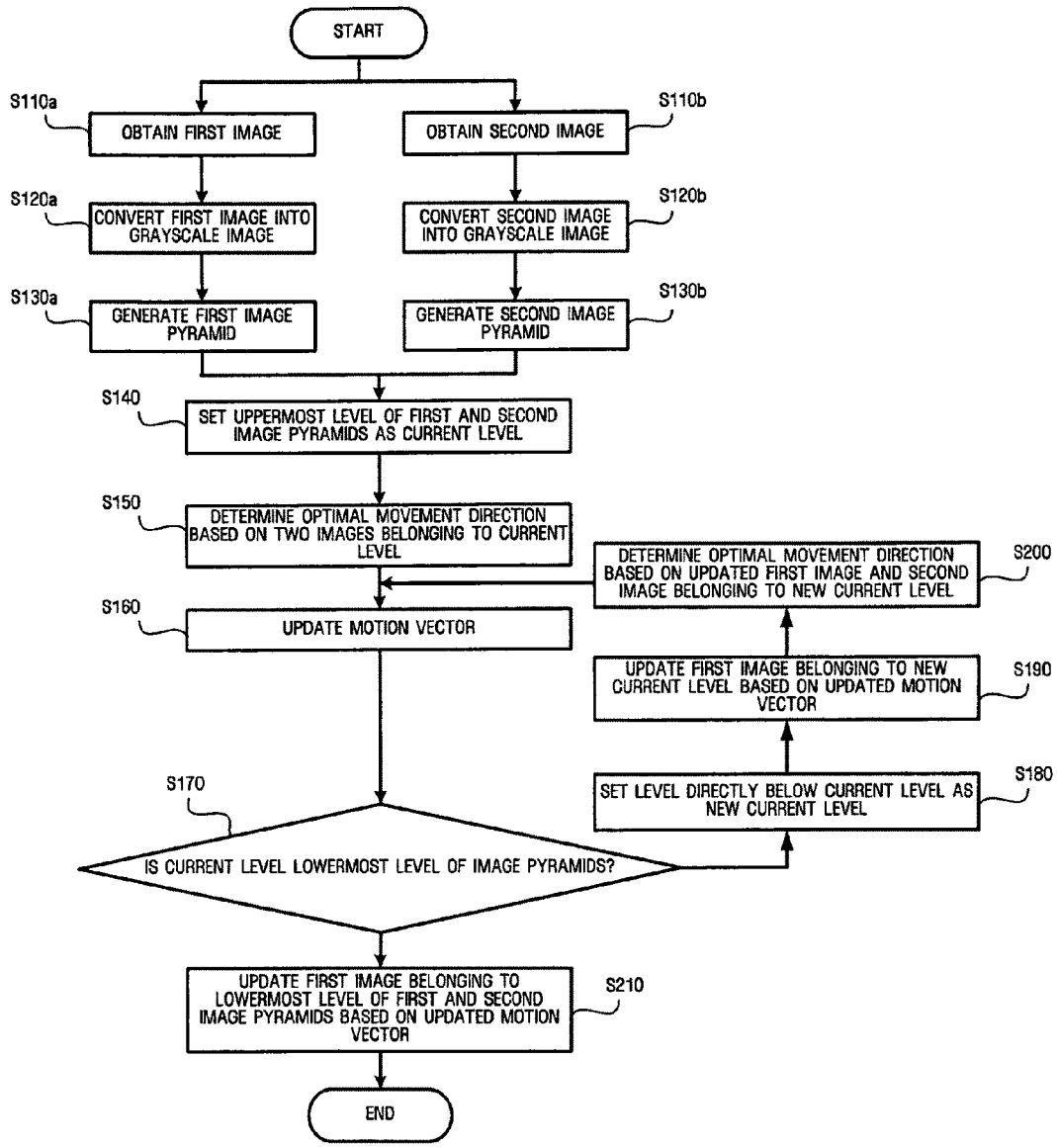
FIG. 1 illustrates a flowchart of an image-registration method according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a flowchart of an image-registration method according to an embodiment of the present invention. Referring to FIG. 1, the image-registration method includes obtaining a first image and a second image with the aid of an image-capturing apparatus (S110a and S110b), converting the first and second images into mono-channel images (S120a and S120b), generating two image pyramids, i.e., first and second image pyramids using sub-sampling (S130a and S130b), determining optimal movement directions for each of a plurality of levels of the first and second image pyramids based on two images belonging to a corresponding level of the first and second image pyramids (S150 and S200), updating a motion vector based on an optimal movement direction (S160), determining whether the current level is the lowermost level of the image pyramids (S170), and updating a first image belonging to a level directly below a level currently being set based on the updated motion vector (S190 and S210).

Figure 7:
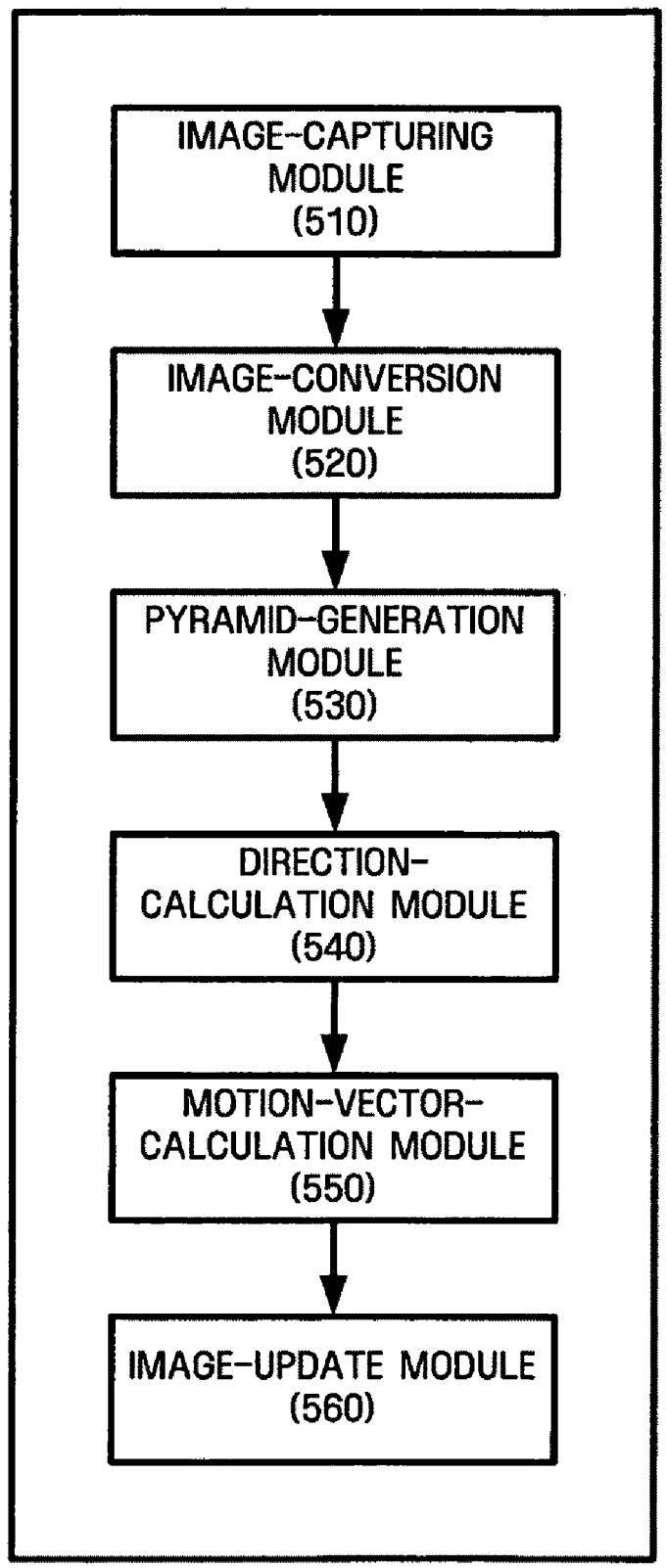
FIG. 7 illustrates a block diagram of an image-registration apparatus according to an embodiment of the present invention.

Specifically, referring to FIGS. 1 and 7, two images, i.e., first and second images, are obtained using an image-capturing module 510, which includes an image sensor (S110a and S110b).

Image sensors are elements of image-capturing apparatuses which generate an image by converting light reflected from a subject into an electric image signal, and are largely classified into charge-coupled device (CCD) image sensors and complementary metal oxide semiconductor (CMOS) image sensors according to how they are manufactured and how they operate.

According to an embodiment of the present invention, it is possible to stably perform image registration not only on images obtained using one image-capturing apparatus but also on images obtained by using more than one image-capturing apparatus with different modalities. For example, according to an embodiment of the present invention, it is possible to perform image registration on an image obtained by a typical camera and an image obtained by an infrared (IR) camera or on a computed tomography (CT) image and a magnetic resonance imaging (MRI) image. Thus, embodiments of the present invention can be widely applied to various imaging systems. Therefore, according to embodiments of the present invention, it is possible to perform image registration regardless of the type(s) of image-capturing apparatus(es) and the number of image-capturing apparatuses used to obtain the first and second images.

Thereafter, an image-conversion module 520 converts the first and second images into mono-channel images (S120a and S120b). Examples of the mono-channel images include grayscale images and images with only one of red (R), green (G) and blue (B) channels.

Since the first and second images are converted into mono-channel images, it is possible to perform image registration on various types of images, for example, color images, black-and-white images, IR images, or medical images such as CT or MRI images.

Thereafter, a pyramid-generation module 530 generates two image pyramids, i.e., first and second image pyramids, using the first and second images or using the mono-channel images generated by the image-conversion module 520.

Figure 2:
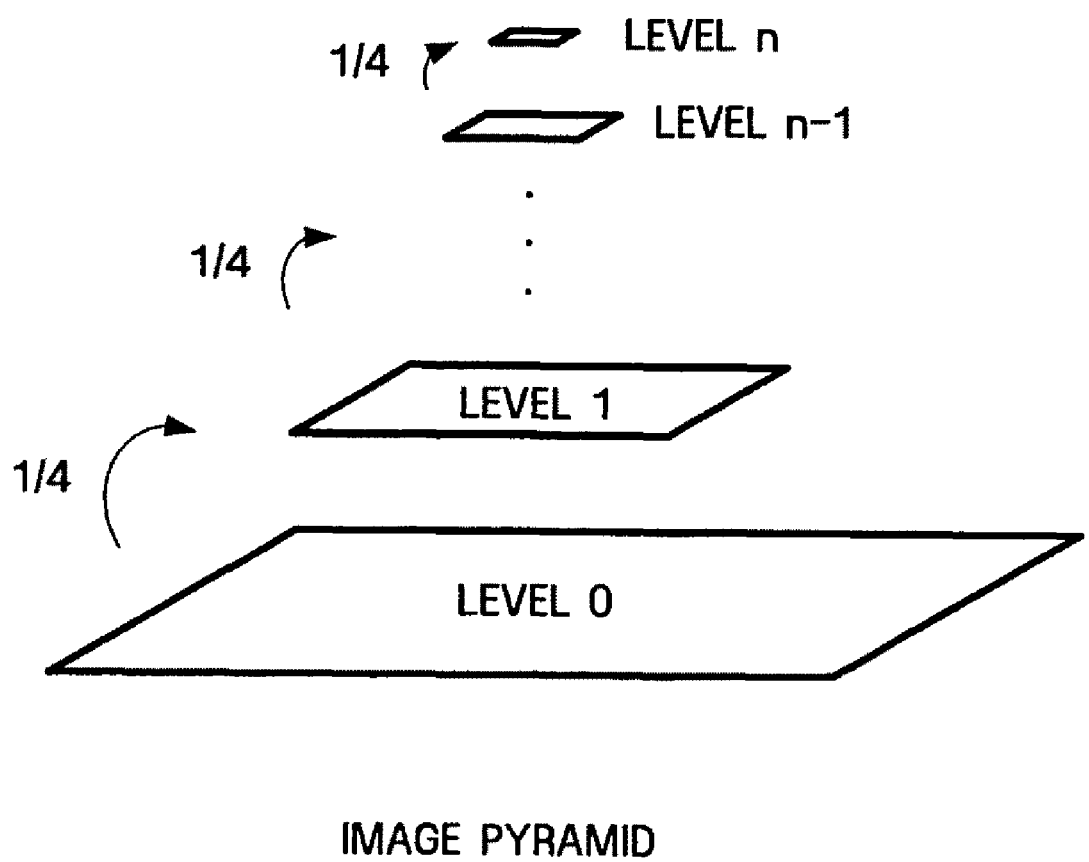
FIG. 2 illustrates an image pyramid obtained by sub-sampling which reduces the length and width of an image by half, according to an embodiment of the present invention.
Figure 3:
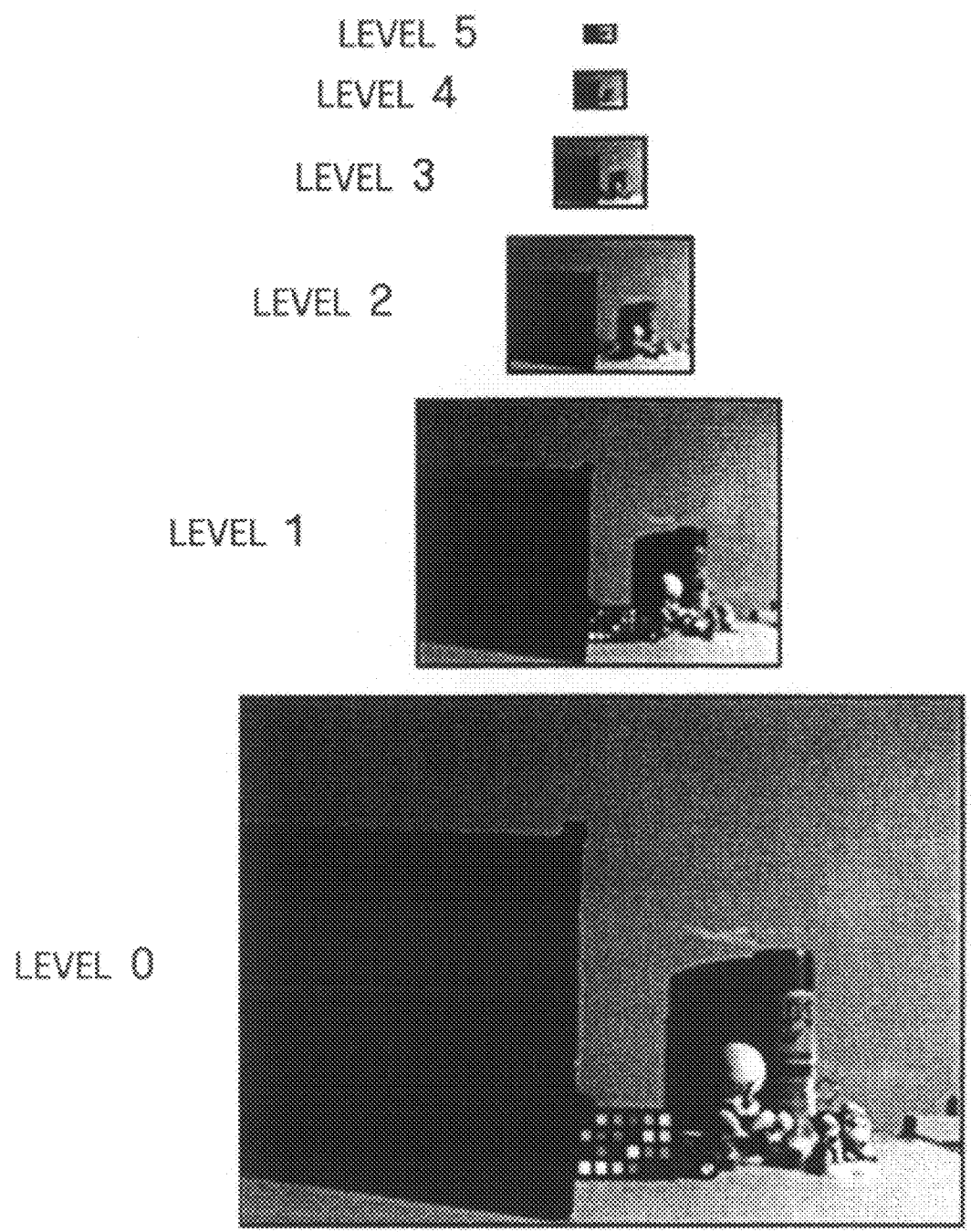
FIG. 3 illustrates an actual image pyramid obtained by sub-sampling which reduces the length and width of an image by half.

FIG. 2 illustrates an image pyramid obtained by sub-sampling that reduces the length and width of an image by half, according to an embodiment of the present invention, and FIG. 3 illustrates an actual image pyramid obtained by sub-sampling that reduces the length and width of an image by half.

In general, during image registration, a considerable amount of data needs to be processed in order to extract a motion vector from a source image, and, thus, the time required to perform image-registration increases. In order to address this, image pyramids may be used to reduce the size of images to be processed while keeping the properties of the images intact.

Referring to FIGS. 2 and 3, when an image having the same size as an original image is referred to as a zeroth-level image, an image having the smallest size is referred to as an n-th-level image (where n=5), and the smaller the size of an image, the higher the level of the image. In this case, the higher the level of an image, the lower the resolution of the image, and the lower the level of an image, the higher the resolution of the image.

In the embodiment of FIGS. 2 and 3, an image pyramid is generated by performing sub-sampling, which reduces the length and width of an image by half, for each level. Thus, whenever such sub-sampling is performed, the number of pixels of an image is reduced by one fourth, and the size of the image is also reduced by one fourth. Sub-sampling may be performed by dividing an image into a number of 2×2 regions, extracting a pixel at a predetermined location in each of the 2×2 regions and generating a new image based on the extracted pixels. Since an image belonging to a level directly above the level of the original image is generated by selecting one pixel from the 2×2 regions, the size of the image belonging to the level directly above the level of the original image is one fourth of the size of the original image, and the resolution of the image belonging to the level directly above the level of the original image is lower than the resolution of the original image.

Referring to FIG. 1, image registration is performed on the first and second images by updating a motion vector of each of a plurality of levels of the first and second image pyramids in the order from an uppermost level to a lowermost level of the first and second image pyramids.

Specifically, the uppermost level of the first and second image pyramids of the first and second images, i.e., an n-th level, is set as a current level (S140). Then, a direction-calculation module 540 determines one of five directions respectively corresponding to (−1, 0), (1, 0), (0, 0), (0, −1), and (0, 1) as an optimal movement direction based on two images belonging to the uppermost level of the first and second image pyramids (S150).

Figure 4:
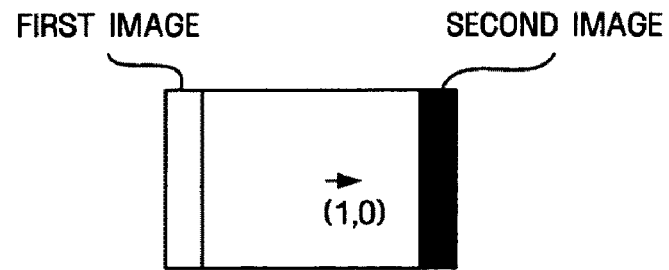
FIG. 4 illustrates five directions used to estimate an optimal movement direction, according to an embodiment of the present invention.
Figure 4:
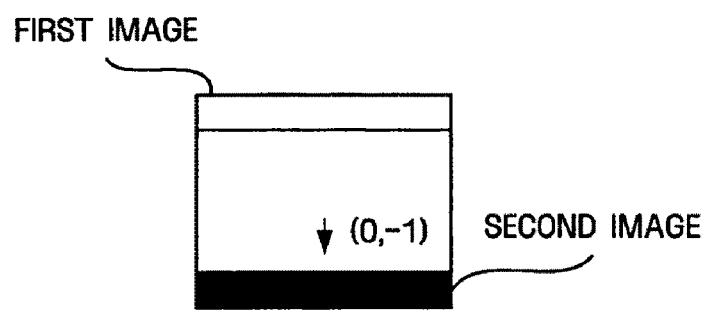
Figure 4:
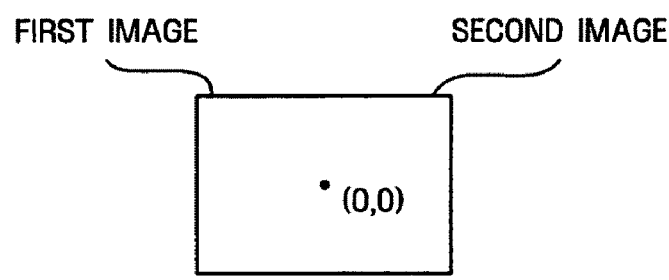
Figure 4:
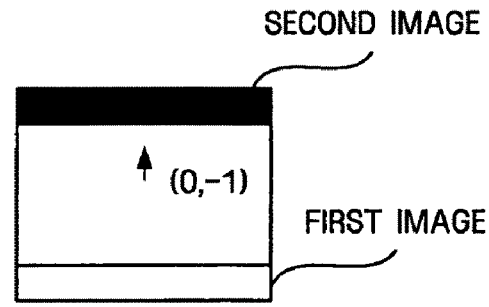
Figure 4:
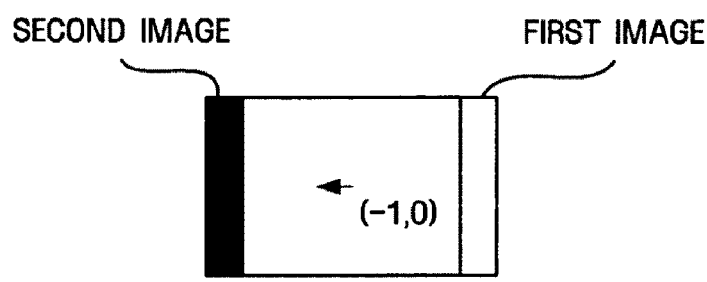

FIG. 4 illustrates five directions used to determine an optimal movement direction, according to an embodiment of the present invention. Referring to FIG. 4, five objective functions for determining a motion vector are set for the respective five directions, and it is determined which of the objective functions produces a maximum value. Then, a direction corresponding to whichever of the objective functions produces a maximum value is determined as an optimal movement direction. Therefore, an optimal movement direction $v_n$ for the uppermost level of the first and second image pyramids, i.e., the n-th level, corresponds to one of (−1, 0), (1, 0), (0, 0), (0, −1), and (0, 1).

In order to determine an optimal movement direction, a conventional luminance-based or probability-based method may be used. The luminance-based method may use a correlation algorithm, a normalized correlation algorithm or a sum of the absolute difference (SAD) algorithm, and the probability-based method may use a mutual information algorithm or a normalized mutual information algorithm. Since the correlation, normalized correlation, SAD, mutual information and normalized mutual information algorithms are well known to one of ordinary skill in the art to which embodiments of the present invention pertain, detailed descriptions thereof will be skipped.

By using the probability-based method, it is possible to stably perform image registration even on images having very different properties. However, the probability-based method results in a considerable amount of computation. In contrast, according to embodiments of the present invention, it is possible to reduce the required amount of computation, and thus to perform image registration at high speed by calculating only five objective functions for each level of image pyramids using the probability-based method.

Referring again to FIG. 1, once the optimal movement direction $v_n$ for the n-th level is determined, the motion-vector-calculation module 550 calculates a motion vector for the n-th level based on the optimal movement direction $v_n$ (S160).

Thereafter, a level directly below the n-th level, i.e., an (n−1)-th level, is set as a new current level (S180). Then, an image-update module 560 updates a first image belonging to the (n−1)-th level based on the motion vector for the n-th level (S190). A motion vector for updating the first image belonging to the (n−1)-th level is $2v_n$ because the length and width of an image belonging to a particular level of an image pyramid are respectively twice the length and width of an image belonging to a level directly above the particular level, and thus a motion vector for the particular level of an image pyramid is twice a motion vector for the level directly above the particular level.

Thereafter, the direction-calculation module 540 determines an optimal movement direction $v_{n-1}$ based on the updated first image belonging to the (n−1)-th level and a second image belonging to the (n−1)-th level (S200). Operation S200 is performed in the same manner as operation S150. The optimal movement direction $v_{n-1}$, like the optimal movement direction $v_n$, corresponds to one of (−1, 0), (1, 0), (0, 0), (0, −1), and (0, 1).

Thereafter, the motion-vector-calculation module 550 updates the motion vector for updating the first image belonging to the (n−1)-th level based on the optimal movement direction $v_{n-1}$ by doubling the optimal movement direction $v_n$ and adding the optimal movement direction $v_{n-1}$ to the result of the doubling (S160). As a result, the motion vector for updating the first image belonging to the (n−1)-th level is updated with $2v_n+v_{n-1}$. Thereafter, a level directly below the (n−1)-th level, i.e., an (n−2)-th level, is set as a new current level (S180). Then, the image-update module 560 updates a first image belonging to the (n−2)-th level based on the updated motion vector $2v_n+v_{n-1}$ obtained in operation S160 (S190). A motion vector for updating the first image belonging to the (n−2)-th level is $2^2v_n+2v_{n-1}$, which is twice the motion vector determined for the (n−1)-th level. The optimal movement direction $v_n$ for the n-th level contributes to motions in an image belonging to the (n−2)-th level by $2^2$ times as much as it does to motions in an image belonging to the n-th level because the length and width of the image belonging to the n-th level are respectively $2^2$ times less than the length and width of the image belonging to the (n−2)-th level. Likewise, the optimal movement direction $v_{n-1}$ for the (n−1)-th level contributes to the update of an image belonging to the (n−2)-th level by two times as much as it does to the update of an image belonging to the (n−1)-th level because the length and width of the image belonging to the (n−1)-th level are respectively half the length and width of the image belonging to the (n−2)-th level. Therefore, a motion vector for updating a first image belonging to the (n−2)-th level is determined to be $2^2v_n+2v_{n-1}$.

Thereafter, the direction-calculation module 540 determines an optimal movement direction based on the updated first image belonging to the (n−2)-th level and a second image belonging to the (n−2)-th level (S200), and updates the motion vector (S160). Operations S160 through S200 are performed repeatedly until the lowermost level of the first and second image pyramids, i.e., a zeroth level, is set as a new current level.

In this manner, an updated motion vector for a first level obtained in operation S160 is determined to be $2^{n-1}v_n + 2^{n-2}v_{n-1} + \ldots + v_1$, and a motion vector for updating a first image belonging to the zeroth level is determined to be $2^n v_n + 2^{n-1}v_{n-1} + \ldots + 2v_1$, which is twice the updated motion vector for the first level. Then, an optimal movement direction $v_0$ for the zeroth level is determined based on an updated first image belonging to the zeroth level and a second image belonging to the zeroth level, and the motion vector for updating the first image belonging to the zeroth level is updated with $2^n v_n + 2^{n-1}v_{n-1} + \ldots + 2v_1 + v_0$. In this case, since the current level is the lowermost level of the first and second image pyramids, i.e., the first image belong to the zeroth level is updated based on the motion vector $2^n v_n + 2^{n-1}v_{n-1} + \ldots + 2v_1 + v_0$ (S210).

In this manner, the motion vector for updating the lowermost level of the first and second image pyramids may be determined to be $2^n v_n + 2^{n-1}v_{n-1} + \ldots + 2v_1 + v_0$, and the original first image may be updated based on the motion vector $2^n v_n + 2^{n-1}v_{n-1} + \ldots + 2v_1 + v_0$, thereby completing image registration.

Figure 5:
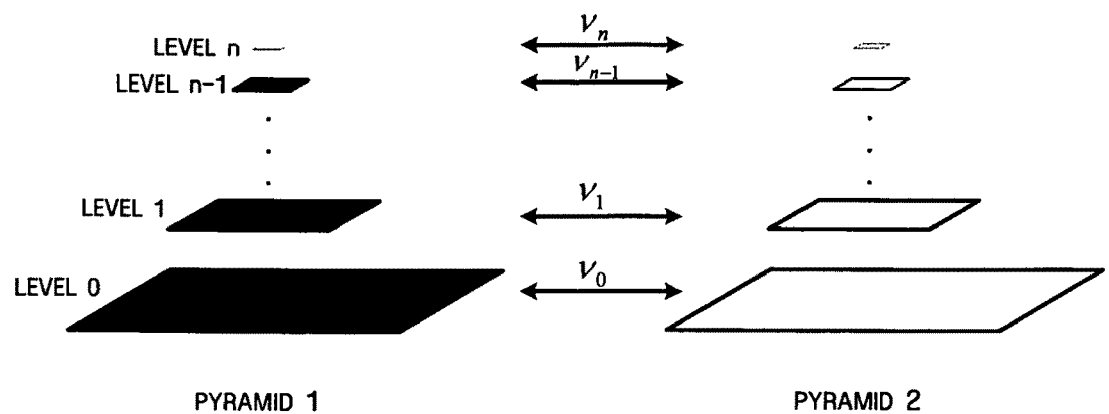
FIG. 5 illustrates two image pyramids and optimal movement directions determined for respective corresponding levels of the two image pyramids.
Figure 6:
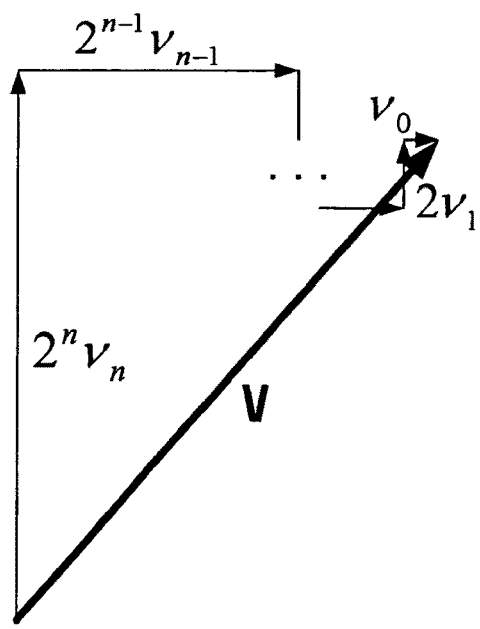
FIG. 6 illustrates a final motion vector updated based on optimal movement directions determined for respective corresponding levels of image pyramids, according to an embodiment of the present invention.

FIG. 5 illustrates optimal movement directions (or motion vectors) determined for respective corresponding levels of first and second image pyramids, and FIG. 6 illustrates a final motion vector updated based on the optimal movement directions determined for the respective levels of the first and second image pyramids illustrated in FIG. 5.

Referring to FIG. 5, for an uppermost level of the first and second image pyramids, i.e., an n-th level, an optimal movement direction is determined based on a first image and a second image belonging to the n-th level, whereas, for each of the (n−1)-th through zeroth levels of the first and second image pyramids, a first image belonging to a corresponding level is updated based on a motion vector determined for a level directly above the corresponding level, and an optimal movement direction is determined based on the updated first image and a second image belonging to the corresponding level. A final motion vector obtained using optimal movement directions $v_n, v_{n-1}, \ldots, v_1$ and $v_0$ respectively determined for the n-th through zeroth levels of the first and second image pyramids, respectively, is illustrated in FIG. 6. Since each of the optimal movement directions $v_n, v_{n-1}, \ldots, v_1$ and $v_0$ corresponds to one of (1, 0), (−1, 0), (0, 0), (0, 1), and (0, −1), the vector length of an optimal movement direction may gradually decrease for lower levels of the first and second image pyramids FIG. 7 illustrates a block diagram of an image-registration apparatus according to an embodiment of the present invention. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Referring to FIG. 7, the image-registration apparatus includes the image-capturing module 510, the pyramid-generation module 530, the direction-calculation module 540, the motion-vector-calculation module 550, and the image-update module 560. The image-registration apparatus may also include the image-conversion module 520.

Referring to FIG. 7, the image-capturing module 510 may include an image sensor which detects light reflected from a subject, and converts the light into an electric signal. The image-capturing module 510 obtains two images, i.e., first and second images.

The pyramid-generation module 530 generates first and second image pyramids by performing sub-sampling, which reduces the length and width of each of the first and second images by half.

The direction-calculation module 540 determines one of five directions respectively corresponding to $(-1, 0)$, $(1, 0)$, $(0, 0)$, $(0, -1)$, and $(0, 1)$ as an optimal movement direction for a current level of the first and second image pyramids based on two images belonging to the current level using a luminance-based method or a probability-based method. The luminance-based method may use the correlation algorithm, normalized correlation algorithm or sum of the absolute difference (SAD) algorithm, and the probability-based method may use the mutual information algorithm or the normalized mutual information algorithm.

The motion-vector-calculation module 550 updates a motion vector based on the optimal movement direction determined for the current level. The update of a motion vector has already been described above, and thus, a detailed description thereof will be skipped.

The image-update module 560 updates a first image belonging to a level directly below the current level based on the updated motion vector obtained by the motion-vector-calculation module 550.

The update of a motion vector and the update of a first image are performed for each of a plurality of levels of the first and second image pyramids in the order from an uppermost level to a lowermost level of the first and second image pyramids. Once a motion vector for a particular level of the first and second image pyramids is updated, a first image belonging to a level directly below the particular level is updated, and a motion vector for the level directly below the particular level is updated based on the updated first image and a second image belonging to the level directly below the particular level. In this manner, a final motion vector for image registration is obtained.

The image-conversion module 520 may perform grayscale conversion on the first and second images obtained by the image-capturing module 510.

Briefly, the term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The capability provided for in the components and modules may be combined into fewer components and modules or further separated into additional components and modules.

In addition, embodiments of the present invention have been described above with reference to flowchart illustrations of user interfaces, methods, and media according to embodiments of the invention. It will be understood that each block of the flowchart illustrations, and combinations of blocks in the flowchart illustrations, can be implemented by computer readable code, as noted below. These computer readable code instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions specified in the flowchart block or blocks, for example.

Further, each block of the flowchart illustrations may represent a module, segment, or portion of code, which includes one or more executable instructions, i.e., computer readable code, for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Accordingly, in view of the above, and in addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, the image-registration method, medium, and apparatus according to embodiments of the present invention have the following advantages.

First, it is possible to improve the speed of image registration by using image pyramids and calculating only five objective functions for each level of the image pyramids.

Second, it is possible to apply embodiments of the present invention to camera systems that operate online and thus to easily realize hardware devices by reducing the amount of computation required for image registration.

Third, it is possible to stably perform image registration on images having very different properties (such as different luminances, motion blur levels, and modalities) from each other by using a probability-based method such as the mutual information algorithm and the normalized mutual information algorithm to calculate five objective functions for each level of image pyramids.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An image-registration method comprising:
obtaining a first image and a second image;
generating first and second image pyramids based on the first and second images, respectively, by performing sub-sampling which reduces the length and width of each of the first and second images by half; and
determining one of five directions respectively corresponding to (−1, 0), (1, 0), (0, 0), (0,−1), and (0, 1) as an optimal movement direction for a current level of the first and second image pyramids based on two images belonging to a corresponding level, updating a motion vector for the current level based on the optimal movement direction for the current level and updating a first image belonging to a level directly below the current level based on the updated motion vector for the current level,
wherein the updating of the motion vector comprises respectively updating a motion vector for each of a plurality of levels of the first and second image pyramids in an order from an uppermost level to a lowermost level as the current level respectively increments from the uppermost level to the lowermost level.

2. The image-registration method of claim 1, further comprising converting the first and second images into mono-channel images.

3. The image-registration method of claim 2, wherein the mono-channel images are grayscale images.

4. The image-registration method of claim 1, wherein the determining comprises determining the optimal movement direction for the current level using one of a luminance-based method and a probability-based method.

5. The image-registration method of claim 4, wherein the luminance-based method uses one of a correlation algorithm, a normalized correlation algorithm, and a sum of absolute differences (SAD) algorithm.

6. The image-registration method of claim 4, wherein the probability-based method uses one of a mutual information algorithm and a normalized mutual information algorithm.

7. The image-registration method of claim 1, wherein, if there are plural image pyramids and a plurality of levels of the plural pyramids ranging from a lowermost level to an uppermost level are respectively referred to as zeroth, first, . . . , n-th levels, a motion vector V may be defined by the equation:

$$V = \sum_{k=0}^{n} 2^{n-k} v_{n-k},$$

where $v_k$ indicates an optimal movement direction determined for a k-th level.

8. An image-registration apparatus comprising:
an image-capturing module which obtains a first image and a second image using an image sensor;
a pyramid-generation module which generates first and second image pyramids based on the first and second images, respectively, by performing sub-sampling which reduces the length and width of each of the first and second images by half;
a direction-calculation module which determines one of five directions respectively corresponding to (−1, 0), (1, 0), (0, 0), (0, −1), and (0, 1) as an optimal movement direction for a current level of the first and second image pyramids based on two images belonging to the current level;
a motion-vector-calculation module which updates a motion vector for the current level based on the optimal movement direction for the current level; and
an image-update module which updates a first image belonging to a level directly below the current level based on the updated motion vector for the current level,
wherein the motion-vector-calculation module respsectively calculates a motion vector for each of a plurality of levels of the first and second image pyramids in an order from an uppermost level to a lowermost level as the current level respectively increments from the uppermost level to the lowermost level.

9. The image-registration apparatus of claim 8, further comprising an image-conversion module which converts the first and second images into mono-channel images.

10. The image-registration apparatus of claim 9, wherein the mono-channel images are grayscale images.

11. The image-registration apparatus of claim 8, wherein the direction-calculation module determines the optimal movement direction for the current level using one of a luminance-based method and a probability-based method.

12. The image-registration apparatus of claim 11, wherein the luminance-based method uses one of a correlation algorithm, a normalized correlation algorithm, and a sum of absolute differences (SAD) algorithm.

13. The image-registration apparatus of claim 11, wherein the probability-based method uses one of a mutual information algorithm and a normalized mutual information algorithm.

14. The image-registration apparatus of claim 8, wherein, if there are plural image pyramids and a plurality of levels of the plural pyramids ranging from a lowermost level to an uppermost level are respectively referred to as zeroth, first, . . . , n-th levels, a motion vector V may be defined by the equation:

$$V = \sum_{k=0}^{n} 2^{n-k} v_{n-k},$$

where $v_k$ indicates an optimal movement direction determined for a k-th level.

* * * * *

UNITED STATES PATENT AND TRADEMARK OFFICE
CERTIFICATE OF CORRECTION

PATENT NO. : 8,300,985 B2
APPLICATION NO. : 12/222963
DATED : October 30, 2012
INVENTOR(S) : Seok Lee et al.

Page 1 of 1

It is certified that error appears in the above-identified patent and that said Letters Patent is hereby corrected as shown below:

In the Claims:

Column 10; Line 29-30; In Claim 8, delete "respsectively" and insert -- respectively --, therefor.

Signed and Sealed this
Fourteenth Day of May, 2013

Teresa Stanek Rea
*Acting Director of the United States Patent and Trademark Office*